United States Patent
Kurumada et al.

(10) Patent No.: US 6,646,712 B1
(45) Date of Patent: Nov. 11, 2003

(54) COMMAND SYSTEM FOR PERFORMING CENTRALIZED MANAGEMENT OF DATA IN A COMMAND DESK

(75) Inventors: Toshimi Kurumada, Koriyama (JP); Hiroshi Endo, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 0 days.

(21) Appl. No.: 09/403,602

(22) PCT Filed: Mar. 17, 1999

(86) PCT No.: PCT/JP99/01326

§ 371 (c)(1),
(2), (4) Date: Jan. 13, 2000

(87) PCT Pub. No.: WO99/48271

PCT Pub. Date: Sep. 23, 1999

(30) Foreign Application Priority Data

Mar. 17, 1998 (JP) ............................................ 10/088085

(51) Int. Cl.⁷ ................................................ H04M 3/42
(52) U.S. Cl. .................................................. 349/214.01
(58) Field of Search ...................... 379/214.01, 265.02, 379/266.01, 319

(56) References Cited

U.S. PATENT DOCUMENTS

| | | | | | |
|---|---|---|---|---|---|
| 4,790,004 | A | * | 12/1988 | Nalbone | 379/214 |
| 5,757,904 | A | * | 5/1998 | Anderson | 379/265 |
| 6,408,055 | B1 | * | 6/2002 | Kokubun | 379/67.1 |
| 6,453,022 | B1 | * | 9/2002 | Weinman, Jr. | 379/88.13 |
| 6,456,705 | B1 | * | 9/2002 | Tanaka et al. | 379/156 |

FOREIGN PATENT DOCUMENTS

| | | |
|---|---|---|
| JP | 63-185148 | 7/1988 |
| JP | 2-42857 | 2/1990 |
| JP | 6-188996 | 7/1994 |
| JP | 7-107170 | 4/1995 |
| JP | 8-274886 | 10/1996 |

* cited by examiner

*Primary Examiner*—Creighton Smith
(74) *Attorney, Agent, or Firm*—Foley & Lardner

(57) ABSTRACT

The invention stores command data such as a trunk number, a dial number and the like in storage units 202 and 205 of a command desk 2, and when the kind of a connection is inputted from the command desk 2, it transfers these command data to an exchange apparatus 1 and the exchange apparatus 1 performs a command connection on the basis of the transferred command data, and therefore it is possible to change a command group and a command destination in this command desk 2 by changing only command data stored in this command desk 2.

9 Claims, 7 Drawing Sheets

COMMAND SYSTEM FOR PERFORMING CENTRALIZED MANAGEMENT OF DATA IN A COMMAND DESK

TECHNICAL FIELD

The present invention relates to a command system for performing various commands using a communication line.

BACKGROUND ART

In previous command systems an input means for inputting the type of command connection and a storage unit for storing a trunk group to be used for a connection have been provided in a command desk, and a dial number to be used for performing a command connection for each trunk group and each trunk is stored in an exchange apparatus.

In the conventional system described above, however, it is necessary to change, at the same time, both data stored in a command desk and data stored in an exchange apparatus when changing the type, the scope and the destination of a command. In case of changing such data, therefore, there exists a problem that an administrator of a command desk and an administrator of an exchange apparatus have to change the data at the same time in concert with each other.

The present invention solves this problem, and also stores in a command desk a dial number comprising data to be used originally by an exchange apparatus, sends the dial number from the command desk to the exchange apparatus when performing a command connection, and thus manages the data unitarily in the command desk.

DISCLOSURE OF THE INVENTION

The invention for solving the above-mentioned problem is characterized in that a command desk is provided with an input means for performing a line specified connection, a simultaneous command connection, a group command connection, an individual command connection, etc., and a storage unit for storing such data as a trunk number, a dial number etc. necessary for performing various connections. When the type of a connection has been inputted from said input means, data such as a trunk number, a dial number, etc. necessary for performing a corresponding connection, are transferred from the command desk to the exchange apparatus, and said exchange apparatus performs a command connection on the basis of this data.

According to the present invention, since data such as a trunk number, a dial number and the like necessary for an exchange apparatus to perform a command connection are stored in a command desk and are transferred to the exchange apparatus at the time of connection, the exchange apparatus does not need to manage the data and the data can be unitarily managed.

BEST MODE FOR EMBODYING THE INVENTION

Figure 1:
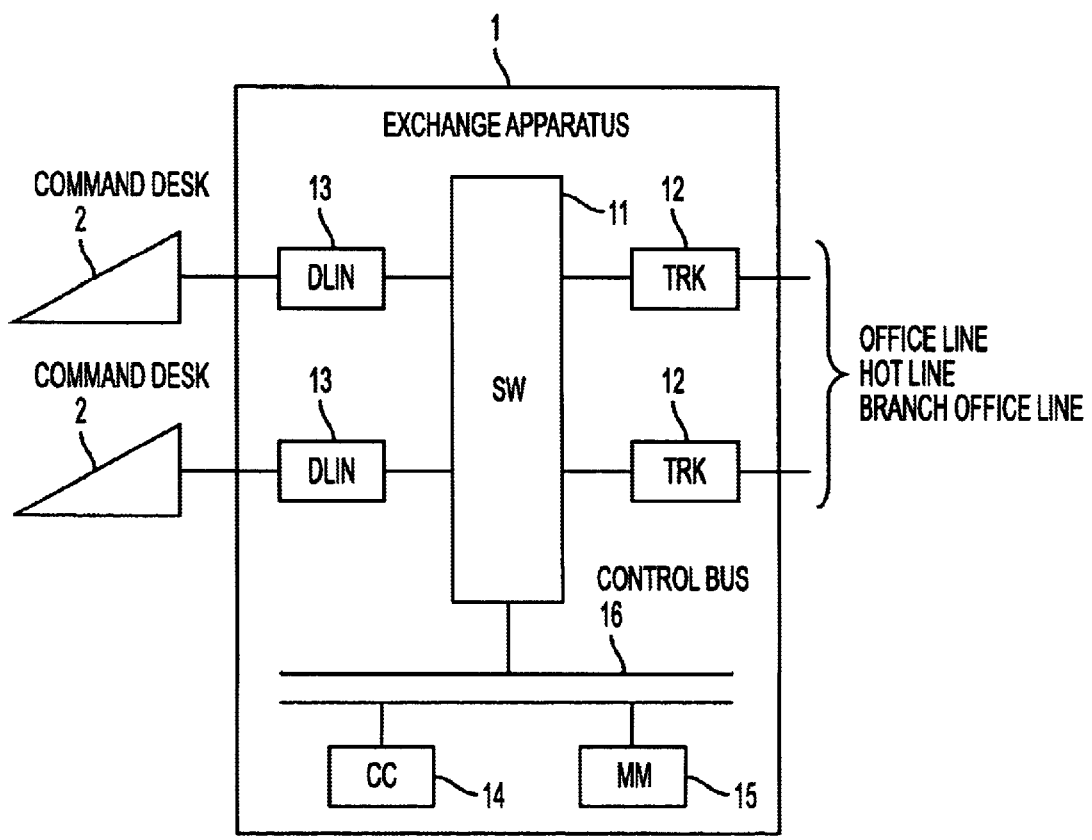
FIG. 1 is a system configuration diagram of an embodiment of the present invention.

FIG. 1 is a system configuration diagram of a command system according to an embodiment of the present invention.

In the figure, number 1 represents an exchange apparatus and 2 represents a command desk, the combination forming command system.

Numbers 11 to 16 represent components of the exchange apparatus 1; and 11 being a channel switch (SW) and 12 being a trunk (TRK) which is connected to an office line, a hot line, a branch office line etc.

Number 13 is a dedicated line (DLIN) for connecting a command desk 2 and the channel switch (SW) 11 to each other, and comprises two bearer channels (B channels) of 64 kbps for carrying aural signals and a data channel (D channel) of 16 kbps for carrying a call control signal.

Number 14 is a central control unit (CC), which controls the whole exchange apparatus 1 and connects two command desks to each other, and connects a command desk 2 and a trunk (TRK) 12 connected with an office line, a hot line, a branch office line or the like through the channel switch (SW) 11.

Number 15 is a storage unit (MM), which stores programs for the central processing unit (CC) 14 to control the exchange apparatus 1, office data, and various tables.

A control bus 16 provides a signal path for connecting the central processing unit (CC) 14, the storage unit (MM) 15 and the channel switch (SW) 11.

Although not illustrated, the trunks (TRK) 12 and the dedicated lines (DLIN) 13 also each have a signal path to the central processing unit (CC) 14.

Figure 2:
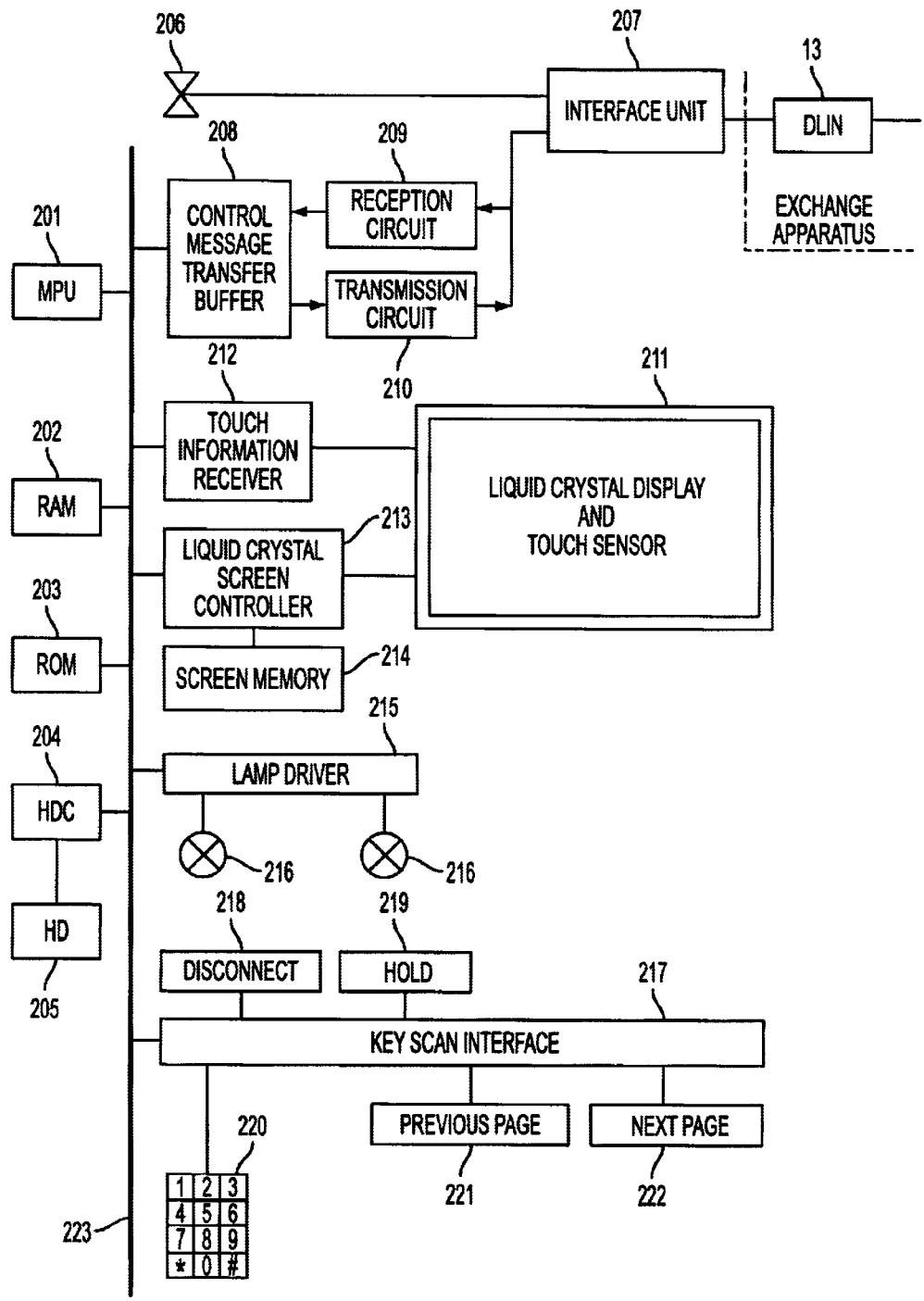
FIG. 2 is a block composition diagram of a command desk in an embodiment of the present invention.

FIG. 2 is a block composition diagram of the command desk 2, and 201 is a call control processor (MPU) for controlling the whole command desk 2 and is connected to a bus 223.

Number 202 is a temporary memory unit (RAM), 203 is a fixed memory unit (ROM), 204 is a hard disk controller (HDC) and 205 is a hard disk unit (HD), each of which is connected directly or indirectly to the bus 223.

The call control processor (MPU) 201 reads out a call control program stored in the hard disk unit (HD) 205 according to a boot program stored in the fixed memory unit (ROM) 203, writes it into the temporary memory unit (RAM) 202 and executes the call control program.

The temporary memory unit (RAM) 202 also reads out data that is different depending upon the respective offices or command desks from the hard disk unit (HD) 205, and controls operation of the command desk 2.

Number 207 is an interface unit for connecting the command desk 2 and the dedicated line (DLIN) 13 of the exchange apparatus 1 by means of an ISDN basic interface, and in the command desk 2 one of the bearer channels (B channels) for talking is connected to a handset 206 for talking and a data channel (D channel) for signal is connected to a reception circuit 209 for receiving a call control message and to a transmission circuit 210 for transmitting a call control message to the exchange apparatus.

Number 208 is a control message transferring buffer, and is a buffer for said reception circuit 209 and said transmission circuit 210.

Number 211 is a liquid crystal display and touch sensor, which is used as a display of line names and the like, a status display of lines and the like, or an input means (key), and can display a more number of lines and the like by changeover of pages.

Number 212 is a touch information receiver for receiving information of the coordinates x and y of a point pressed by finger on the liquid crystal display and touch sensor 211 and transferring the information to the call control processor (MPU) 201.

Number 213 is a liquid crystal screen controller which displays each screen, each key, the line name of each key and the color of each key on the display panel of the liquid crystal display and touch sensor 211 by control of the call control processor (MPU) 201, and has a screen memory 214 in the outside of it.

Number 215 is a lamp driver, which controls lamps 216 to be turned on or off.

Number 217 is a key scan interface, which monitors a disconnect key 218, a hold key 219, dial keys 220, a previous page key 221 and a next page key 222 which are called hard keys.

The key scan interface 217 can also have a keyboard connected with it.

Figure 3:
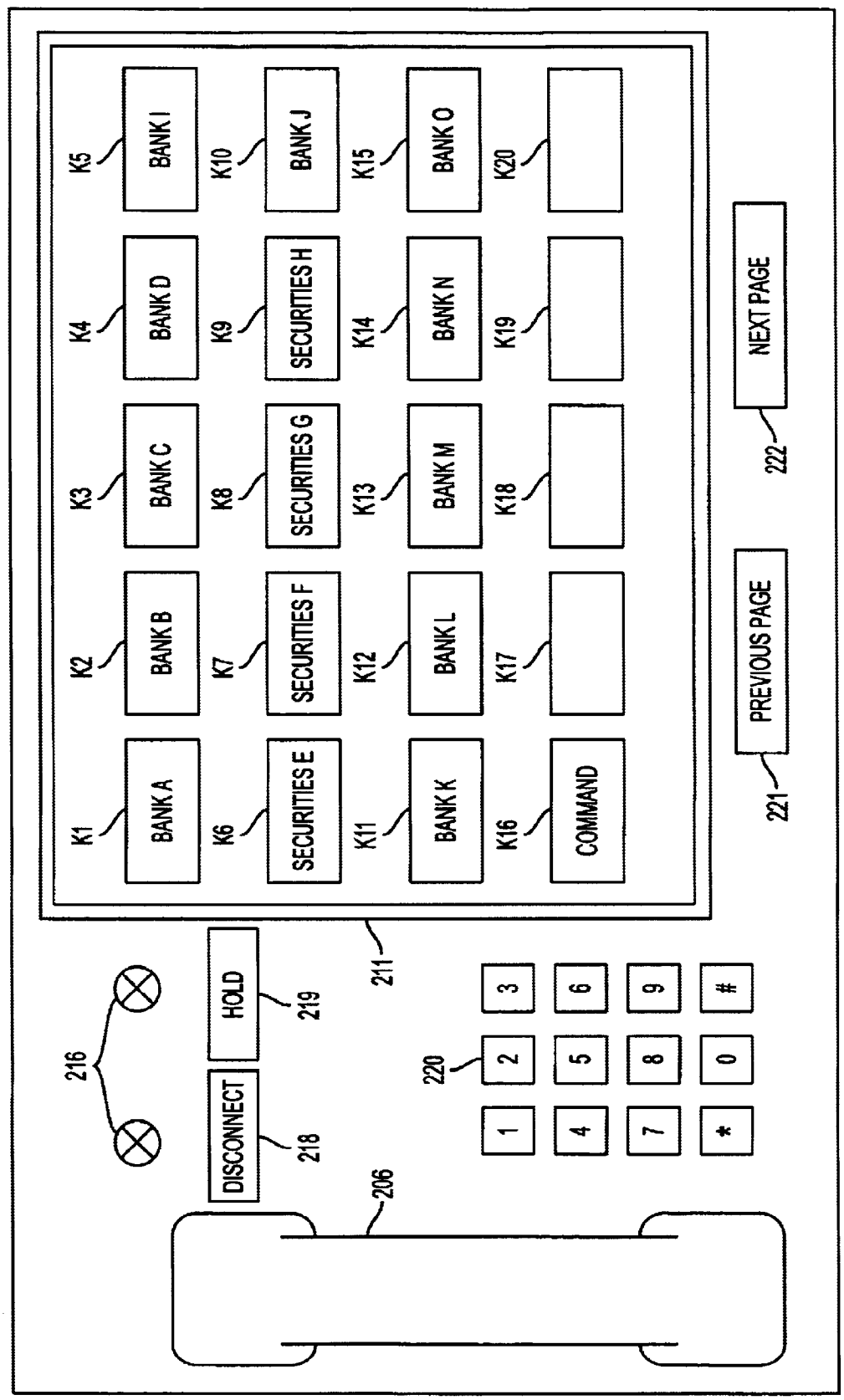
FIG. 3 is a figure showing an operator panel of the command desk.

FIG. 3 is a figure showing an operator panel of the command desk, said figure showing a usually displayed line display screen on the liquid crystal display and touch sensor 211 on the right. A line-specified connection is performed by means of this screen.

On the left of the operator panel, there is a handset 206, on the right of which the push button dial 220 is arranged in the lower part and the disconnect key 218, the hold key 219 and the lamps 216 are arranged in the upper part.

The previous page key 221 and the next page key 222 are provided under the liquid crystal display and touch sensor 211.

Buttons K1 to K15 on the line screen of the liquid crystal display and touch sensor 211 shown in FIG. 3 each have an automatic dialing function, an incoming call display function and an answering function.

Figure 4:
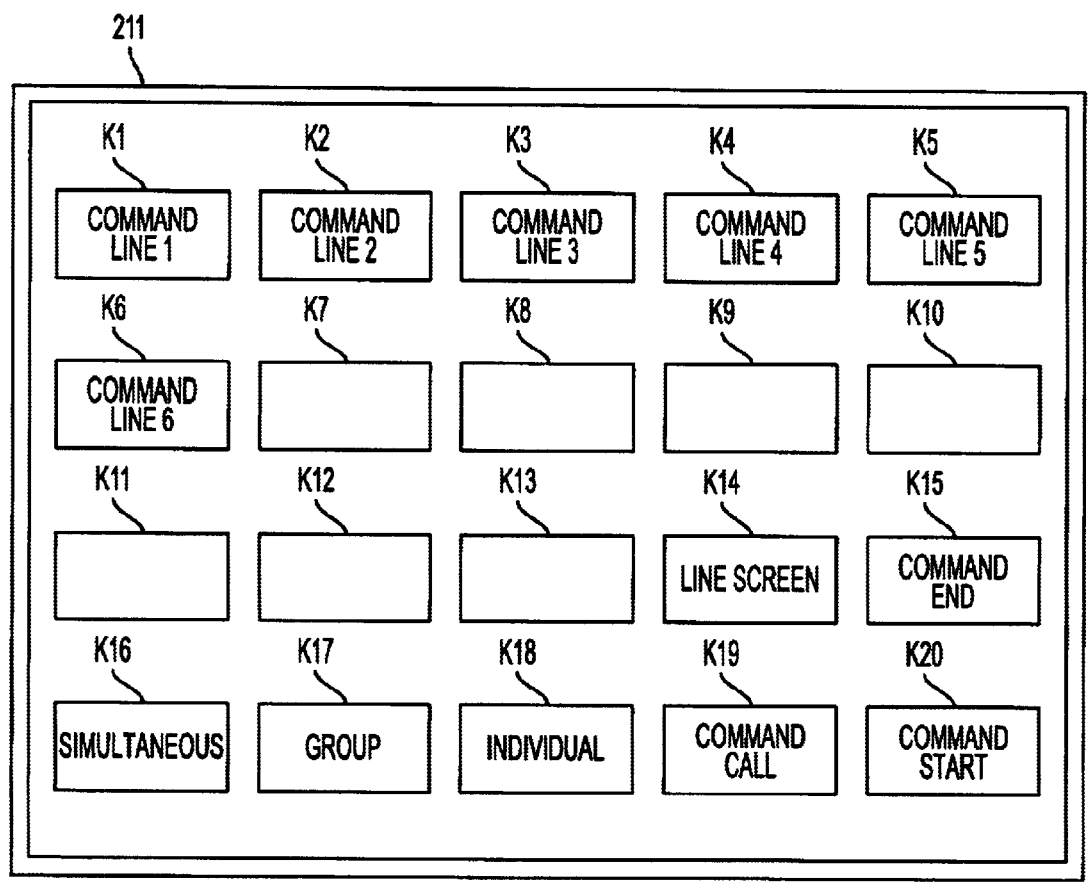
FIG. 4 is a figure showing a liquid crystal display screen of the command desk in case of performing a command.

And the display screen of the liquid crystal display and touch sensor 211 can be changed over to a command screen shown in FIG. 4 by pressing a command button K16.

FIG. 4 shows the command screen, in which buttons indicated by command lines 1 to 6, namely, buttons K1 to K6 correspond to the respective trunks (TRK) 12 and each of the buttons indicates a status of a line with a color and a blinking period of it. In this embodiment, a button Kn corresponding to a trunk (TRK) 12 used in a command call is turned on to become red and performs a red and slow blinking action during the command call, and turns green at the time of receiving the opposite party's answer.

Since a button Kn corresponds to one of the trunks (TRK) 12, it is possible to select one of the trunks (TRK) 12 by pressing a button Kn in case of an individual command.

A simultaneous button K16 is a button to be pressed in case of a simultaneous command, and acquires every trunk (TRK) 12 to be an object of the command.

When the simultaneous button is pressed, it is turned on to become green and indicates a simultaneous command state.

A group button K17 is a button used for a group command, and the kind of trunks (TRK) 12 of each group is previously registered in a memory.

An individual button K18 is used for performing a command to one or plural individuals. After the individual button K18 is pressed, a command line button, for example, K1 of a command line in which a trunk (TRK) 12 to be given a command is stored is pressed. The command line button K1 is turned on to become red by information sent through the data channel from the exchange apparatus 1, and indicates that the command is possible.

A command call button K19 is a button to be pressed after setting the kind of a command and, according to need, the scope of it, and command call button information is sent to the exchange apparatus 1 through the data channel.

The exchange apparatus 1 which has received the command call button information starts a specified trunk (TRK) 12 and sends out a dial number to a line of dial connection.

An answer of a called subscriber is monitored by the exchange apparatus 1 and the answer information is sent through the data channel to the command desk 2 and is displayed on the liquid crystal display 211.

A commander at the command desk 2 monitors an answer state and presses a command start button K20 when starting a command. At this time the command start button K20 is turned on to become green.

A command end button K15 is a button to be pressed when a command has ended, and command end button information is sent through the data channel to the exchange apparatus 1 and the exchange apparatus 1 releases all the trunks which have been used in processing the command. On the other hand, the command desk 2 turns off all the lamps on the command screen.

A line screen button K14 is a button for changing over the command screen of FIG. 4 to the line screen of FIG. 3, and does not function during a command operation and becomes effective after the command end button K15 has been pressed.

Figure 5:
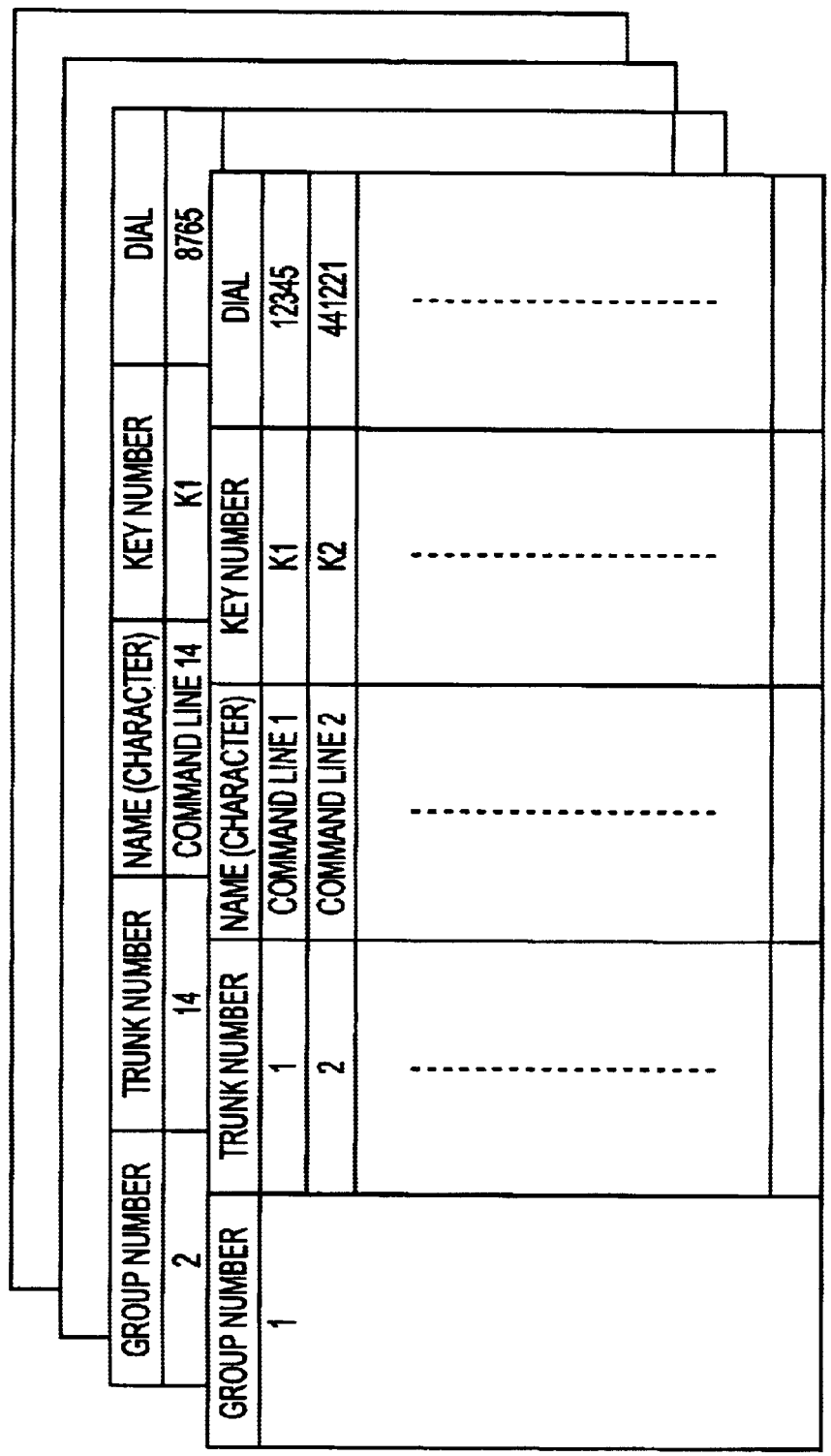
FIG. 5 is a figure showing command data for each group stored in a storage unit of the command desk.

FIG. 5 is a figure showing data which are necessary for performing a command in case a command connection and are stored in the temporary memory unit(RAM) 202 of the command desk 2.

A group number corresponds to a group in a group command, a trunk number is the number of a trunk (TRK) 12 to be used in a group command, a name (character) is a name displayed on a button shown in FIGS. 3 and 4, a key number is the number of one of keys K1 to K20 shown in FIGS. 3 and 4, and a dial is a dial number to be sent to the opposite party's office after the exchange apparatus 1 has acquired a trunk (TRK) 12.

Since tables as shown in FIG. 5 are stored in the temporary memory unit (RAM) 202, in case of a group command a command connection is performed on the basis of information stored in a corresponding table.

In case of a simultaneous command, the command is performed to the trunk numbers of all the groups.

In case of a command call process, since the command desk 2 sends a trunk number and a dial number together with indication of a command call through a data channel to the exchange apparatus, the exchange apparatus dose not need to keep information for a command call stored in it.

Figure 6:
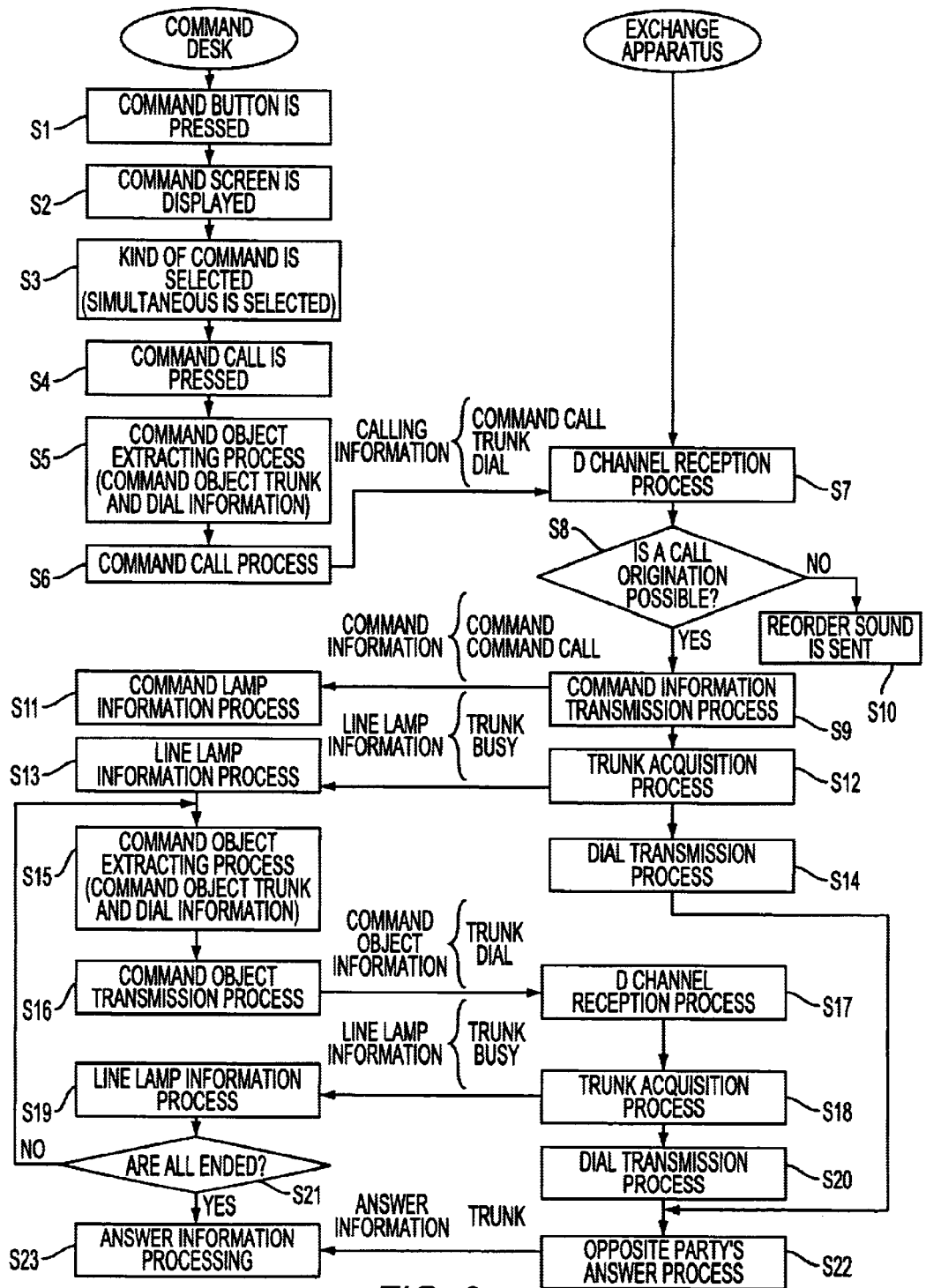
FIG. 6 is one part of a flowchart showing operations of the command desk and an exchange apparatus in case of performing a simultaneous command from the command desk.
Figure 7:
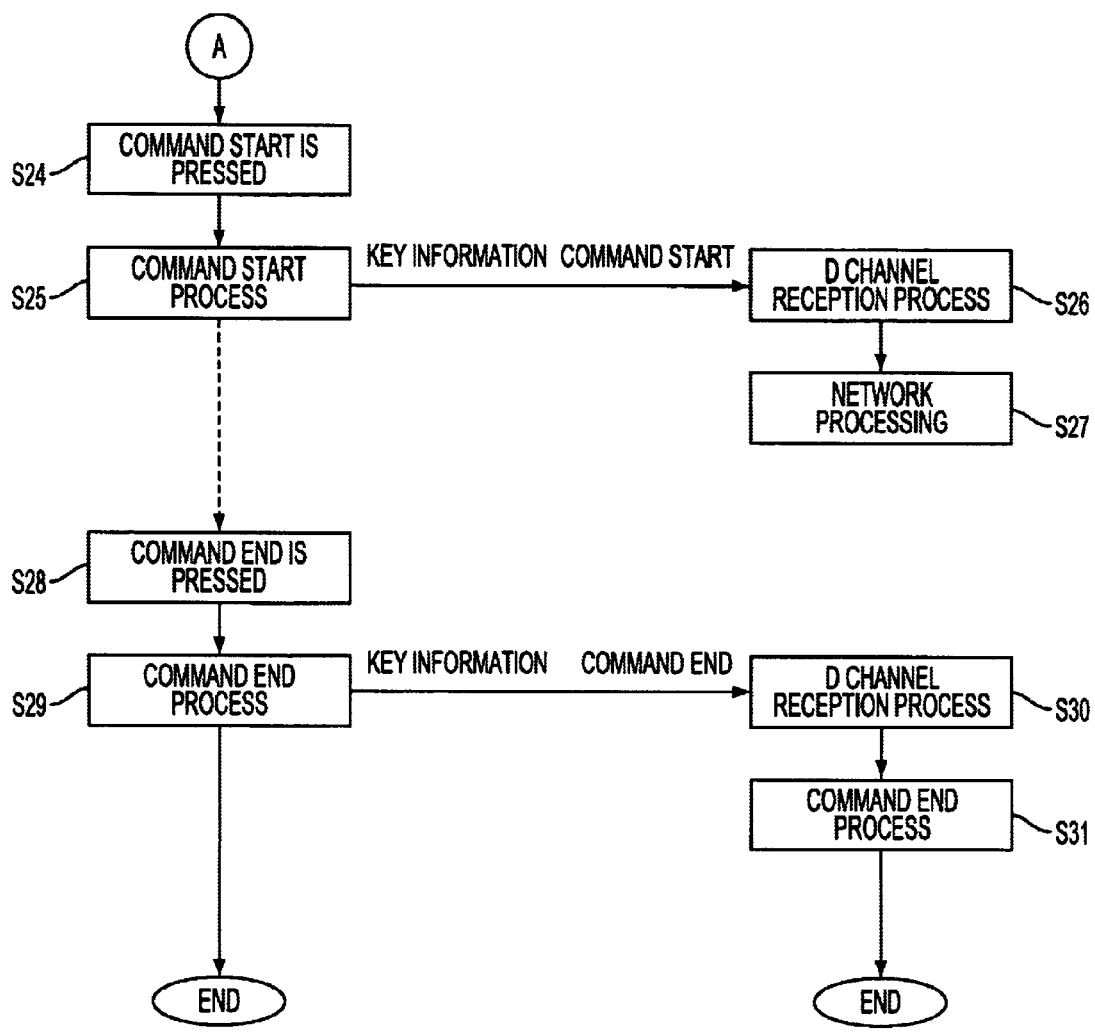
FIG. 7 is the other part of the flowchart shown in FIG. 6.

Operation of a command connection is described with reference to a flowchart shown in FIGS. 6 and 7.

When a commander in the command desk 2 presses the command button K16 of the liquid crystal screen 211 shown in FIG. 3 (step S1), the liquid crystal display screen 211 is changed over to the command screen of FIG. 4 (step S2).

Next, the commander selects the kind (simultaneous, group or individual) of the command and presses a corresponding button. When it is assumed that the commander has selected a simultaneous command (step S3) in this case, the simultaneous button is turned on to become green and the command type in the temporary memory unit (RAM) 202 is set as a simultaneous command.

Following this, the commander presses the command call button (step S4).

Due to this, the call control processor (MPU) 201 reads out a trunk which is an object of the command and the dial number of a called subscriber from the temporary memory unit (RAM) 202 (step S5).

Next, a command call process is performed (step S6), and the simultaneous command, the command call, the location of the trunk (TRK) 12 in the channel switch (SW) 11, and the dial number are edited into a format of calling information and sent through the data channel to the exchange apparatus 1.

The exchange apparatus 1 analyzes the information received from the data channel (D channel) (step S7), and judges whether or not a call origination can be performed by means of the received calling information (step S8).

If the call origination can be performed, the exchange apparatus 1 performs a transmission process of the command information that means that the command call can be originated (step S9). The command information includes a command for notifying that the command is possible and a command call for turning on a lamp.

The command kind sent through the data channel (D channel) is stored temporarily in the storage unit (MM) 15 of the exchange apparatus 1.

In case that a call origination is not possible in step S8, the exchange apparatus 1 sends a reorder sound to the command desk 2 (step S10).

When receiving lamp information sent in step S9, the command desk 2 turns on the command call button to become green (step S11). And the command desk 2 stores it into the temporary memory unit (RAM) 202 that the command desk 2 has come into a command call state due to reception of the command information.

When the exchange apparatus 1 has ended the command information transmission process (step S9), it performs a trunk acquisition process (step S12). The exchange apparatus 1 acquires a trunk (TRK) 12 according to the trunk information of the command object out of the calling information received in step S7, and activates the opposite party's office. And it sends line lamp information for making busy the line lamp of the acquired trunk (TRK) 12 through the data channel to the command desk 2.

The command desk 2 turns on a line lamp to become red according to the received line lamp information and indicates a busy state (step S13).

When the exchange apparatus 1 has acquired a trunk (TRK) 12 (step S12), it performs a dial transmission process (step S14) and waits for the opposite party's answer.

When the command desk 2 has ended a line lamp information process (step S13), it performs a command object extracting process to the next line. Namely, it extracts a command object trunk (TRK) 12 and dial information (step S15).

Following this, in a command object transmission process, the command desk 2 transfers the command object information consisting of a trunk number and a dial number through the data channel (D channel) to the exchange apparatus 1 (step S16).

The exchange apparatus 1 performs a D channel reception process (step S17), and performs a trunk acquisition process (step S18).

When the exchange apparatus 1 has performed the trunk acquisition process, it transfers line lamp information consisting of a trunk number and busy information to the command desk 2, and the command desk 2 performs a line lamp information processing and turns on a lamp button to become red, said lamp button corresponding to the line acquired by the exchange apparatus 1 (step S19).

When the exchange apparatus 1 has ended the trunk acquisition process in step S18, it performs a dial number sending process to the line (step S20) and comes into a state of waiting for the opposite party's answer.

On the other hand, the command desk 2 judges whether or not the processes for the command object trunk have been completely ended, and if they have not been ended, the command desk 2 returns to the command object extracting process in step S15 and repeats these processes. When all the processes for the command object trunk have been ended, the command desk 2 proceeds to the next step (step S21).

The exchange apparatus 1 monitors the opposite party's answer for each line, performs an opposite party's answer processing for each answer, and transfers answer information and a trunk number to the command desk 2 (step S22).

Each time answer information is sent from the exchange apparatus 1, the command desk 2 turns on a corresponding line button to become green and displays the whole answering state so as to be seen (step S23).

As watching an answering state, the commander presses a command start button (step S24).

The command desk 2 performs a command start process and sends key information for a command start to the exchange apparatus 1 through the D channel (D channel) (step S25).

When the exchange apparatus 1 performs a D channel reception process and identifies that it is a command start operation (step S26), it performs a network processing for multi-connecting a transmission line from the command desk 2 through a dedicated line circuit (DLIN) connected to the command desk 2 and a channel switch (SW) for a speech path of the responded trunk (TRK) 12 (step S27).

When the command has ended, the commander presses a command end button of the command desk 2 (step S28).

The command desk 2 sends key information of end of the command through the data channel (D channel) to the exchange apparatus 1, performs an ending process inside the command desk 2, and ends the command talking (step S29).

On the other hand, the exchange apparatus 1 knows end of the command by a D channel reception process (step S30) and performs a command end process (step S31).

Thus, the exchange apparatus 1 and the command desk 2 both return to an ordinary state.

According to this embodiment, since data such as a trunk number, a dial number and the like necessary for an exchange apparatus 1 to perform a command connection are stored in a command desk 2 and are transferred to the exchange apparatus 1 at the time of connection, the exchange apparatus 1 does not need to manage these data and the data can be unitarily managed.

And according to this embodiment, since the exchange apparatus 1 performs a command connection process by means of information sent through a data channel from the command desk 2 without storing a group number, a trunk number, a destination dial number in relation to a command, even if said group number, trunk number or dial number in relation to a command is changed, it is enough to change only data in a table of FIG. 5, said data being stored in a temporary memory unit (RAM) 202 or a hard disk 205 of the command desk 2.

That is to say, this embodiment has an effect that it is possible to change the content of a command connection by changing only command data of a command desk 2 without performing a complicated operation of changing both data of the command desk 2 and the exchange apparatus 1 as performed in the prior art.

Although this embodiment uses a liquid crystal display and touch sensor 211, it may use any of a combination of a CRT display with a touch sensor and a combination of a plasma display with a touch sensor, and difference in kind of components used does not impair the effects of the present invention.

INDUSTRIAL APPLICABILITY

As described above, the present invention is effective to a system consisting of an exchange apparatus and a command desk for performing a line specified connection, a simultaneous command connection, a group command connection, an individual command connection and the like, and is suitable for unification of data management by burdening the command desk rather than the exchange apparatus with management of data such as a trunk number, a dial number and the like necessary for a line specified connection, a simultaneous command connection, a group command connection, an individual command connection and the like as described above.

What is claimed is:

1. A command system performing a centralized management of data in a command desk, wherein the command desk is provided with an input means for performing a line specified connection, a simultaneous command connection, a group command connection, and an individual command connection, and a storage unit for storing data comprising a trunk number and a dial number necessary for said connections, and when the type of a connection is inputted from said input means, data comprising a trunk number, a dial number necessary for performing a corresponding connection are transferred from the command desk to an exchange apparatus and said exchange apparatus performs a command connection on the basis of these data.

2. A command system adapted to perform centralized management of data in a command desk, wherein the command desk is provided with an input device adapted to perform a plurality of types of connections including a line specified connection, a simultaneous command connection, a group command connection, and an individual command connection, and a storage unit adapted to store data necessary for the connections, the data including a trunk number and a dial number, and wherein the system is adapted so that when the type of connection is inputted from said input device, data necessary for performing a corresponding connection, including a trunk number and a dial number are transferred from the command desk to an exchange apparatus and said exchange apparatus performs a command connection on the basis of these data.

3. The system of claim 1, wherein the command desk comprises a control processor adapted to control the command desk, and further comprising a temporary memory unit, a hard disk unit, a fixed memory unit, wherein the processor, the temporary memory unit and the fixed memory unit are connected together by a bus.

4. The system of claim 3, further comprising an interface unit adapted to connect the command desk to the exchange apparatus.

5. The system of claim 4, wherein a simultaneous command connection comprises the acquisition of every trunk in the exchange apparatus.

6. The system of claim 4, wherein an individual command connection comprises the acquisition of a single trunk.

7. The system of claim 6, wherein the input device is adapted to acquire a single trunk selected from a plurality of trunks.

8. The system of claim 7, wherein the input device is adapted to receive a plurality of specific inputs, and wherein a specific input results in the acquisition of a specific trunk.

9. A method of performing centralized management of data in a command desk comprising:

selecting a type of a command from the group consisting of a simultaneous command, a group command, or an individual command;

indicating to a user the type of command selected;

identifying at least one trunk from a plurality of trunks, the trunks each having separate locations;

electronically compiling an information packet comprising information indicating the type of command selected, a number to be dialed, and the location of the trunk;

automatically analyzing the information packet to determine whether or not a call can be performed;

transmitting data comprising the type of command to an exchange apparatus;

acquiring the identified trunks;

automatically performing a dial transmission process; and transferring the information packet to the exchange apparatus; wherein the exchange apparatus performs a command connection based on the information contained in the information packet.

* * * * *